Sept. 10, 1957  H. W. CARDWELL ET AL  2,805,744
FRICTION PLATE FOR FLUID PRESSURE OPERATED CLUTCH OR BRAKE
Filed Dec. 15, 1952  2 Sheets-Sheet 1

INVENTORS
Harland W. Cardwell
and Richard M. Smoll
BY Bacon + Thomas
ATTORNEYS

INVENTORS
Harland W. Cardwell
and Richard M. Smoll
BY Bacon & Thomas
ATTORNEYS

United States Patent Office 2,805,744
Patented Sept. 10, 1957

2,805,744

FRICTION PLATE FOR FLUID PRESSURE OPERATED CLUTCH OR BRAKE

Harland W. Cardwell and Richard M. Smoll, Wichita, Kans., assignors to Cardwell Clutch and Brake, Inc., Wichita, Kans.

Application December 15, 1952, Serial No. 326,016

1 Claim. (Cl. 192—85)

The present invention relates to fluid pressure operated devices and more particularly to an air pressure operated clutch or brake of the type having an annular inflatable diaphragm member disposed between a pair of flexible discs each carrying a friction facing and adapted to transmit driving torque between the driving and driven elements of a clutch, or to retard rotation of the rotatable element relative to the stationary element of a brake.

The principal object of the invention is to provide an improved inflatable member for effecting actuation of a clutch or brake, and more particularly to provide improved means for mounting the inflatable member on one of the principal elements of the clutch or brake. In this connection, one of the important features of the invention resides in the provision of inwardly extending beads at the inner marginal edges of the inflatable member for firmly securing the inner periphery of the inflatable member to a spacer ring having undercut grooves to receive the beads and preferably being mounted upon a hub, the inflatable member and spacer ring being operatively associated with a pair of normally flat resilient discs also mounted on the hub and engaging the opposite sides of the inflatable member and the spacer to retain the beads in the undercut grooves.

Another object of the invention is to provide a diaphragm having outer surfaces flush with the outer sides of a spacer or mounting member and other portions interlocked with the spacer or mounting member, so that the flat discs employed to carry the friction facings can also be utilized to retain the diaphragm in assembled relation with the spacer or mounting member.

Another object of the invention is to provide an inflatable member for a clutch or brake which includes flat side walls and a flexible fold at the outer regions of said side walls for enabling the side walls of said members to be moved apart axially without any appreciable restraint by the fold and without distortion of the side walls from their normally flat condition.

Other objects and features of the invention will be apparent from the following description taken in conjunction with the accompanying drawings, in which.

The device illustrated in Figs. 1 to 3 will be described hereinafter as a friction clutch, but it is to be understood that the invention is not limited to the use of the device as a clutch inasmuch as the same can obviously be used as a brake by holding either the driving or the driven element of the described clutch stationary.

Figure 1:
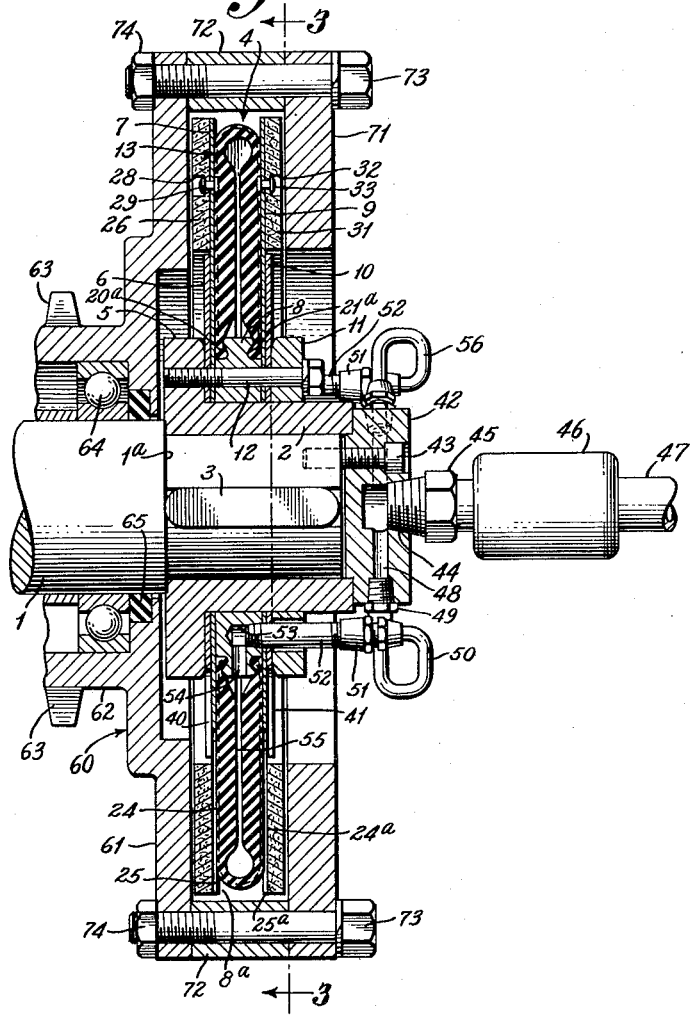
Fig. 1 is a vertical sectional view of a device embodying the principles of the present invention, taken on the line 1—1 of Fig. 3.
Figure 2:
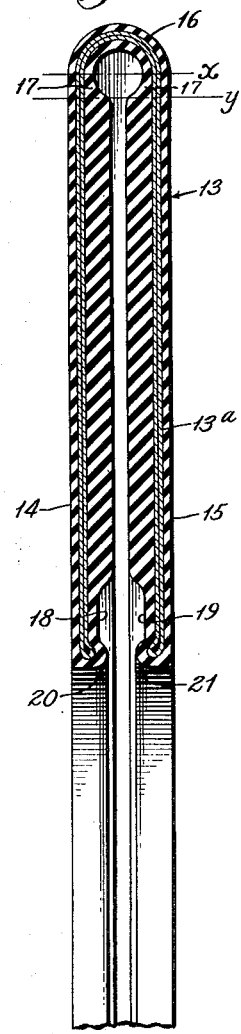
Fig. 2 is an enlarged sectional view through the inflatable member.

Referring now to Fig. 1, a drive shaft is identified by the numeral 1 and a metal hub portion 2 is non-rotatably mounted thereon by means of a conventional key 3. The hub 2 forms an element of a driving part or driving assembly of the clutch, which is generally identified by the numeral 4. The hub portion 2 has a radially extending flange 5 formed on its outer periphery at one end thereof and forms a shoulder on one side of which is disposed, in the order named, a spring metal backing plate 6, a resilient metal disc 7, a metal spacer ring 8, a resilient metal disc 9, a spring metal backing plate 10, and a metallic clamping ring or plate 11. The flange 5 has a plurality of threaded openings, and the spring backing plates 6 and 10, the flexible discs 7 and 9, the spacer 8 and the clamping plate 11 are all provided with openings aligned therewith for the reception of a plurality of cap screws 12 for maintaining the pieces comprising the driving part 4 in assembled relation. As illustrated, one backing plate is disposed on the outer side of each resilient disc for a purpose which will be explained later.

The discs 7 and 9 are separated to provide an annular space 8ª therebetween disposed beyond the outer periphery of the spacer ring 8, and an annular inflatable member 13 is disposed in said space. The inflatable member 13, as best shown in Fig. 2, is generally U-shaped in cross-section and is made of rubber, or the equivalent, for example, "neoprene," having a two-ply fabric reinforcement 13ª. The inflatable member 13 further includes opposed flat side walls 14 and 15 which are thicker than the remainder of the inflatable member. The side walls 14 and 15 are connected together at the outer regions thereof by a relatively thin and flexible semi-circular or fold portion 16, and portions 17 which gradually decrease in thickness from the adjacent edges of the thick side walls 14 and 15 toward the fold portion, that is, between the lines X and Y shown in Fig. 2. The fold portion 16 is about ⅗ as thick as the side walls 14 and 15.

The side walls 14 and 15 are reduced in thickness adjacent their inner margins by molding therein annular recesses 18 and 19 spaced outwardly of the inner edges of the inflatable member 13 and disposed adjacent to, confronting, inwardly extending rounded and reinforced beads 20 and 21, respectively. The maximum axial dimension of the beads 20 and 21 is equal to about ⅘ the thickness of the side walls 14 and 15 or about ¼ greater in thickness than said side walls in the region of the recesses 18 and 19.

The spacer ring 8 has undercut grooves 20ª and 21ª formed in the outer peripheral corners thereof, which are adapted to receive the beads 20 and 21, respectively, of the inflatable member 13. The outer diameter of the flange 5, the clamping ring 11 and the spacer 8 are substantially equal so that when the beads 20 and 21 are received in the grooves 20ª and 21ª and the parts are drawn together by tightening of the cap screws 12, the portions of the inflatable member 13 in the region of the recesses 18 and 19 are placed under sufficient compression to form an air-tight seal between the spacer ring 8 and the inner periphery of the inflatable member 13. It will be observed from Fig. 1 that the flexible discs 7 and 9 engage the outer surfaces of the side walls 14 and 15 of the inflatable member 13 and also contact the adjacent side faces of the spacer ring 8, so that the outer surfaces of the side walls 14 and 15 are maintained substantially flush with and lie in the same vertical plane as the outer faces of the spacer ring 8. The same means, namely, the cap screws 12, which maintain the flexible discs 7 and 9, the backing plates 6 and 10, etc., in assembled relation with the hub 2, also serve as a means for clamping and applying pressure to secure the inflatable member 13 to the spacer 8. Thus, the inflatable member 13 is automatically clamped into tight engagement with the spacer 8, as an incident to the assembly of the driving member 4.

The discs 7 and 9 are respectively provided with a plurality of radial slots 24 and 24a, which extend inwardly from the outer periphery thereof to any desired or practical depth, compatible with the principles of the present invention. By way of illustration, twenty slots 24 and 24a are formed in the discs 7 and 9 and these slots provide the outer marginal portion of said discs with a corresponding number of flexible fingers 25 and 25a. Each of the fingers 25 and 25a is provided with a centrally located hole to receive a fastening member for purposes explained hereinafter. An annular friction facing 26 is disposed on the outer side of the disc 7 and is provided with twenty countersunk holes 28 which register with the holes in the fingers 25. Rivets 29 extend through all of the countersunk holes 28 and through all of the holes in the fingers 25 for securing the friction facing 26 to said fingers. Thus, the friction facing 26 is secured directly to the flexible fingers 25 of the disc 7 for torque transmitting purposes. Similarly, an annular friction facing 31 is provided with twenty countersunk holes 32 and rivets 33 extend through all of said holes and through the holes in the fingers 25a of the flexible disc 9 for directly securing the friction facing 31 to said disc. The friction facings 26 and 31 have an outer diameter slightly greater than the outer diameter of the inflatable member 13, and the outer sides thereof are adapted to engage with the inner faces of a pair of plates comprising a driven clutch part, as will be described more fully hereinafter.

Figure 3:
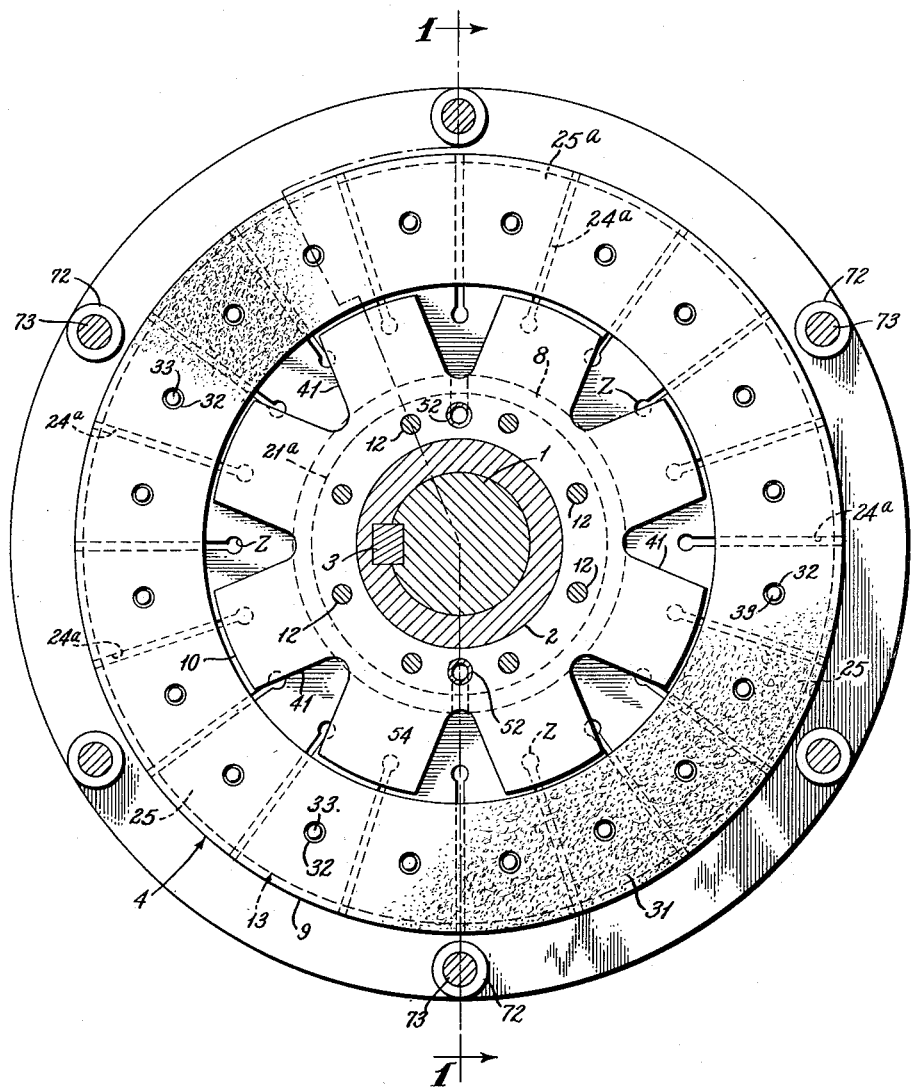
Fig. 3 is a vertical sectional view taken on the line 3—3 of Fig. 1.

The backing plate 10, Fig. 3, has eight spring fingers 41 which extend radially beyond the inner ends of the slots 24a and serve as resilient supports or reinforcing members for the fingers 25a of the disc 9. The backing plate 6, Fig. 1, is provided with a similar number of spring fingers 40 cooperable in a like manner with the slots 24 and fingers 25 of the flexible disc 7. It will be understood from Fig. 3 that the slots 24 and 24a extend inwardly a substantial distance beyond the ends of the fingers 40 and 41 and terminate at their inner ends in drilled holes Z for preventing the formation of fractures in the discs 7 and 9.

One end of the hub 2 engages a shoulder 1a on the shaft 1 and is held in engagement with said shoulder and secured against axial movement relative to the shaft by a cap plate 42 engaged with the opposite end of said hub and mounted upon said shaft by a plurality of cap screws 43, only one of which is shown in Fig. 1. The cap plate 42 has an axial passageway 44, threaded at its outer end to receive a mounting fitting 45 of a conventional swivel 46 having an air pressure supply conduit 47 connected thereto. A radial passage 48 in the cap plate 42 communicates at its inner end with the axial passage 44 and is threaded at its outer end to receive a fitting 49 having one end of a tube 50 connected thereto. The opposite end of the tube 50 is connected by a fitting 51 to one end of a pipe nipple 52, which extends through aligned openings in the clamping ring 11, backing plate 10, and disc 9, and has its opposite end threaded into a transverse passage 53 in the spacer 8. A radial passage 54 is formed in the spacer 8 and establishes communication between the passage 54 and a pressure chamber 55 formed in the interior of the inflatable member 13. Thus, the conduit 47 is in constant communication with the chamber 55, the supply of operating fluid to and the exhaust of operating fluid from, the chamber 55 being controlled by conventional valve means (not shown) connected with the conduit 47.

A second tube 56, similar to the tube 50, further establishes communication between the passageway 44 and the chamber 55 by exactly the same means described in connection with the tube 50 and thereby provides for rapid admission and exhaust of operating fluid from the chamber 55 to secure rapid engagement and disengagement of the clutch.

A driven clutch part or assembly is generally identified by the numeral 60 and includes a plate portion 61 having an axially extending hub 62 provided with sprocket teeth 63 or any other suitable drive transmitting means. The hub portion 62 is rotatably mounted upon the shaft 1 by a pair of conventional ball bearings 64, one only of which is shown in Fig. 1. The entry of foreign matter into the ball bearing 64 is prevented by a conventional sealing ring 65.

The driven clutch part also includes an annular plate 71 which is maintained in axially spaced confronting relation to the plate 61 by a plurality of tubular spacers 72 disposed between said plates. A bolt 73 extends through each of the spacers 72 and through aligned openings in the plates 61 and 71 and a nut 74 threaded on said bolts maintains the plates 61 and 71 and the spacer 72 in assembled relation. The inner face of the plate 61 is adapted to be engaged by the friction facing 26 and the inner face of the plate 71 is adapted to be engaged by the friction facing 31. Valve means (not shown) controls the supply and exhaust of air, or other operating fluid, under pressure, to the chamber 55 through the tubes 50 and 56. The provision of the two tubes 50 and 56 insures rapid inflation of the expansible member 13 for effecting flexing apart of the outer marginal portions of the discs 7 and 9 to insure quick engagement of the friction facings 26 and 31 with the adjacent faces of the plates 61 and 71 of the driven part 60. Movement of the friction facings 26 and 31 into engagement with the plates 61 and 71, respectively, is effected through flexing apart of the discs 7 and 9, and the fingers 25 and 25a thereof to thereby provide driving engagement between the driving part 4 and the driven part 60. The fingers 25 and 25a are yieldably supported during outward flexing by the fingers 40 and 41, respectively, carried by the backing plates 6 and 10.

The discs 7 and 9 are normally flat and tend to return to their original flat condition to retract the friction facings 26 and 31 from driving engagement upon the release of pressure fluid from the chamber 55. However, the spring backing plates 6 and 10, with their flexible fingers 40 and 41, respectively, augment the resilience of the fingers 25 and 25a to effect quick retraction of the friction facings 26 and 31 from driving engagement with their associated plates 61 and 71, and facilitate the expulsion of air from the chamber 55 of the inflatable member 13 to assure quick disengagement of the clutch.

It will be understood that the assembly 4 can be used as a driven instead of a driving part and that the assembly 60 may be employed as a driving instead of a driven part, within the purview of the invention. It will be further understood that changes may be made in the details of construction, proportions, and in the arrangement of the parts described herein, without departing from the principles of the invention and the scope of the annexed claim.

We claim:

A friction plate assembly, comprising a pair of annular, substantially flat discs; spacer means at the inner margins of said discs maintaining said discs separated to provide a space therebetween; friction facing secured to said discs on the outer sides thereof with their outer surfaces lying parallel to the planes of said discs; an inflatable U-shaped member having externally flat and parallel side walls disposed in the space between said discs in juxtaposed relation to said friction facings and providing an expansible pressure chamber between said discs and having a flexible fold portion connecting said walls together at the outer margins thereof, said U-shaped member being formed of flexible material with reinforcing material provided therein throughout the extent of said walls and of said fold portion, said side walls terminating at their inner edges in inwardly extending reinforced beads disposed on the inner face thereof and having annular recesses formed on the inner face thereof adjacent said beads, and said spacer means having grooves to receive said beads and having outer marginal portions extending into said recesses; means clamping said discs against said inflatable member and against said spacer means to retain said beads in said grooves and said outer marginal portions in said recesses; and means communicating with said pressure chamber for introducing operating fluid under pressure into said chamber to flex the side walls of said inflatable member outwardly and urge said discs apart.

References Cited in the file of this patent

UNITED STATES PATENTS

| | | |
|---|---|---|
| 2,169,639 | Grote | Aug. 15, 1939 |
| 2,208,149 | Vernet | July 16, 1940 |
| 2,563,673 | Cardwell et al. | Aug. 7, 1951 |
| 2,715,418 | Van Derbeck | Aug. 16, 1955 |

FOREIGN PATENTS

| | | |
|---|---|---|
| 908,173 | France | Aug. 20, 1945 |